United States Patent

[11] 3,557,852

| [72] | Inventor | Austin C. Wagenknecht<br>Minneapolis, Minn. |
|---|---|---|
| [21] | Appl. No. | 725,486 |
| [22] | Filed | Apr. 30, 1968 |
| [45] | Patented | Jan. 26, 1971 |
| [73] | Assignee | General Mills, Inc.<br>a corporation of Delaware |

[54] PROCESS OF PEELING FOOD PRODUCTS
5 Claims, No Drawings

| [52] | U.S. Cl. | 146/233,<br>146/234 |
|---|---|---|
| [51] | Int. Cl. | A23n 7/02 |
| [50] | Field of Search | 146/233,<br>234, 221.8 |

[56] References Cited
UNITED STATES PATENTS

| 1,394,138 | 10/1921 | Bost et al. | 146/233X |
|---|---|---|---|
| 2,007,693 | 7/1935 | Ruter et al. | |
| 2,156,406 | 5/1939 | Stagmeier | 146/234X |

*Primary Examiner*—Andrew R. Juhasz
*Assistant Examiner*—Z. R. Bilinsky
*Attorneys*—Anthony A. Juettner, William C. Babcock and Kenneth D. Ohm

ABSTRACT: Unpeeled potatoes are placed into an aqueous solution of 3.0 percent to 13.5 percent of active chlorine having an initial pH level of 7 to 13.5, after a predetermined time (which is dependent upon such active chlorine and pH levels) the potatoes are removed from such aqueous solution, and after such removal the chlorinated flavors absorbed by the potatoes are neutralized.

PROCESS OF PEELING FOOD PRODUCTS

One object of the present invention is to provide a method for peeling potatoes and like tubers that does not require cutting devices.

Another object of this invention is to provide a peeling method for potatoes which is accompanied by a complete bleaching of any tissues just below such peel to a snow-white color.

Other objects and advantages of this invention will be apparent from the following description in which certain preferred embodiments of the invention are disclosed.

The method of the invention embraces essentially the application of two agents to the unpeeled potatoes in successive treatments. The first of these agents operates as a peeling and bleaching agent. Its action is ordinarily accompanied by oxidation. The second agent applied is a reducing agent or deoxidizer.

The agent which I prefer to use for the first step of the method of my invention is a hypochlorite of an alkali-forming metal. By alkali-forming metal, I mean those metals (like sodium and calcium) the oxides and hydroxides of which are commonly referred to as "alkalies." Of these hypochlorites I prefer to use sodium hypochlorite. An agent suitable for use in the second step of the process may be selected from a group as follows: phosphites, sulfites, bisulfites, metabisulfites and thiosulfates of alkali-forming metals. I have found sodium bisulfite especially suitable for use as this agent.

As whatever quantity of hypochlorite remaining on the potatoes after the first treatment absorbs a chemical equivalent of the reducing agent applied in the second treatment it is desirable that the potatoes be rinsed in water between the two treatments to remove as much of the hypochlorite as possible. This rinsing can be accomplished by immersing the potatoes in water or by spraying such potatoes with water.

In the treatment of White Rose potatoes, it was found that an aqueous solution of sodium hypochlorite having 5 percent of active chlorine gave especially good results. The unpeeled White Rose potatoes where placed in a sufficient quantity of this sodium hypochlorite solution so that such potatoes were completely immersed in the solution. The solution was at 23° C. when the unpeeled White Rose potatoes were placed therein. The White Rose potatoes remained in such solution for 18 hours and all during this time the solution remained at substantially 23° C. The solution had a pH level of 12.8 when the unpeeled White Rose potatoes were placed therein.

At the end of the 18-hour period, the peel of each of the potatoes had become loosened enough to be removed from the potatoes by mechanical scrubbing and the potatoes were removed from the aqueous sodium hypochlorite solution, scrubbed, rinsed by immersing them in water and then placed in a 1 percent sodium bisulfite solution for 5 hours. All residual chlorinated off-flavors picked up by the now peeled potatoes from the sodium hypochlorite solution were successfully eliminated, i.e., neutralized, by this treatment with the 1 percent sodium bisulfite solution. The treatment of the White Rose potatoes in the specific example of my process described above produced an attractive peeled potato with a snow-white color, natural taste, and natural texture.

In the treatment of California White potatoes, it was found that an aqueous solution of sodium hypochlorite having 3 percent of active chlorine gave especially good results. The unpeeled California White potatoes were placed in a sufficient quantity of this sodium hypochlorite solution so that such potatoes were completely immersed in the solution. The solution was at 23° C. when the unpeeled California White potatoes were placed therein. The California White potatoes remained in such solution for 20 hours and all during this time the solution remained at substantially 23° C. The solution had a pH level of 12.5 when the unpeeled California White potatoes were placed therein.

At the end of the 20-hour period, the peel of each of the potatoes had become loosened enough to be removed from the potatoes by mechanical scrubbing and the potatoes were removed from the aqueous sodium hypochlorite solution, scrubbed, rinsed by immersing them in water, and then placed in a 1 percent sodium bisulfite solution for 22 hours. All residual chlorinated off-flavors picked up by the now peeled potatoes from the sodium hypochlorite solution were successfully eliminated, i.e., neutralized, by this treatment with the 1 percent sodium bisulfite solution. The treatment of the California White potatoes in the specific example of my process described above produced an attractive peeled potato with a snow-white color, natural taste, and natural texture.

In the treatment of Russet potatoes, it was found that an aqueous solution of sodium hypochlorite having 3 percent of active chlorine gave especially good results. The unpeeled Russet potatoes were placed in a sufficient quantity of this sodium hypochlorite solution so that such potatoes were completely immersed in the solution. The solution was at 23° C. when the unpeeled Russet potatoes were placed therein. The Russet potatoes remained in such solution for 20 hours and all during this time the solution remained at substantially 23° C. The solution had a pH level of 12.5 when the unpeeled Russet potatoes were placed therein.

At the end of the 20-hour period, the peel of each of the potatoes had become loosened enough to be removed from the potatoes by mechanical scrubbing and the potatoes were removed from the aqueous sodium hypochlorite solution, scrubbed, rinsed by immersing them in water, and then placed in a 1 percent sodium bisulfite solution for 22 hours. All residual chlorinated off-flavors picked up by the now peeled potatoes from the sodium hypochlorite solution were successfully eliminated, i.e., neutralized, by this treatment with the 1 percent sodium bisulfite solution. The treatment of the Russet potatoes in the specific example of my process described above produced an attractive peeled potato with a snow-white color, natural taste, and natural texture.

While the invention has been described in detail with specific examples for White Rose, California White, and Russet potatoes, such examples are illustrative and are not given as limitations since other modifications within the sphere and scope of the invention will be apparent to those skilled in the art. For example, the White Rose, California White and Russet potatoes could have been treated by a sodium hypochlorite solution having 3.0 percent to 13.5 percent active chlorine, with an initial pH level of from 7.0 to 13.5, with a temperature of from 20° C. to 25° C. for a period of from 18 hours to 24 hours. Preferably, the active chlorine varies from 3.0 percent to 5.0 percent and the pH level varies from 12.0 to 13.0. The time necessary for the peel to become loosened enough to be removed from the potato by spraying or mechanical scrubbing is normally less at the higher levels of active chlorine, pH and/or temperature.

It is evident from all of the foregoing information that certain potatoes require a lesser time of exposure than others to different levels of active chlorine and pH in sodium hypochlorite solutions. In processing any particular type of potato, the minumum time of exposure to obtain virtually complete removal of the peel may be determined by observation. Moreover, in processing any particular type of potato, the minumum time of exposure may be determined in the following manner.

The potatoes are immersed in the aqueous hypochlorite solution and from time to time one of the potatoes is removed from the solution and examined—for example, by rubbing with the fingers—to see whether or not the peel has been loosened so that it is readily removable. When the peel reaches a loose state, the potatoes are withdrawn from the hypochlorite solution. The potatoes are then rinsed by passing through strong sprays of water and thereafter mechanically scrubbed, as by revolving brushes or other mechanical devices, to thereby remove the loosened peels. If the spray is sufficiently strong it will remove the loosened peels and there will be no need for the mechanical scrubbing.

Ordinarily the exposure to the aqueous solution of sodium hypochlorite is conducted at ambient (room) temperature, i.e., 20° C. to 25° C. However, the temperature is not critical and one can use temperatures above or below room temperatures. Elevated temperatures for example, those up to, but not including, temperatures at which the aqueous solution would cook the potatoes, may be desirable to expedite the peel removal process. To attain such increased temperatures, one may supply heating coils, radiant heaters, or the like to the vessel in which the potatoes are immersed in the aqueous hypochlorite solution. In the alternative, one may even mix steam with such aqueous solution.

The concentration of the sodium bisulfite solution may vary from 1 percent to 5 percent in all of the foregoing examples. In addition, the rinsing of the potatoes prior to submerging them in a reducing agent selected from a group consisting of phosphites, sulphites, bisulfites, metabisulfites, thiosulfates of alkali-forming metals can be accomplished by immersing said potatoes in fresh water or spraying such potatoes with fresh water.

In view of the principles set forth herein, I have shown some of the ways of carrying out the present invention and some of the equivalents which are suggested by the disclosure.

I claim:

1. A process for peeling potatoes which comprises immersing the potatoes in an aqueous solution of a hypochlorite of an alkali-forming metal, said solution having an active chlorine level of from 3.0 percent to 13.5 percent and a pH level of from 7.0 to 13.5, and subsequently neutralizing the chlorinated flavors absorbed by the potatoes by contacting said potatoes with an aqueous solution containing a reducing agent selected from a group consisting of phosphites, sulfites, bisulfites, metabisulfites, thiosulfates of alkali-forming metals and wherein said solution containing a reducing agent includes a range of from 1.0 percent to 5.0 percent of sodium bisulfite.

2. A process for peeling potatoes as called for in claim 1 wherein said active chlorine level ranges from 3.0 percent to 5.0 percent and said pH level ranges from 12.0 to 13.0.

3. A process for peeling potatoes which comprises immersing the potatoes in an aqueous solution of a hypochlorite of an alkali-forming metal, said solution having an active chlorine level of from 3.0 percent to 5.0 percent and a pH level of from 7.0 to 13.5, and subsequently neutralizing the chlorinated flavors absorbed by the potatoes.

4. A process for peeling potatoes which comprises immersing the potatoes in an aqueous solution of a hypochlorite of an alkali-forming metal, said solution having an active chlorine level of from 3.0 percent to 13.5 percent and a pH level of from 12.0 to 13.0, and subsequently neutralizing the chlorinated flavors absorbed by the potatoes.

5. A process for peeling potatoes as called for in claim 4 wherein the hypochlorite of an alkali-forming metal is sodium hypochlorite having a range of active chlorine from 3.0 percent to 5.0 percent, the temperature of said aqueous hypochlorite solution has a range of from 20° C. to 25° C., said potatoes are rinsed with water after their removal from said aqueous hypochlorite solution, and said neutralizing aqueous solution has a range from 1.0 percent to 5.0 percent of sodium bisulfite.